United States Patent Office 2,839,554
Patented June 17, 1958

2,839,554
ESTERS OF ANTIMONY

John H. Haslam, Wilmington, Del., assignor to E. I. du Pont de Nemours and Company, Wilmington, Del., a corporation of Delaware No Drawing. Application July 28, 1953
Serial No. 370,872

6 Claims. (Cl. 260—446)

This invention pertains to the preparation of organic esters of antimony.

The organic esters of antimony have heretofore been prepared by the interaction of the antimony chlorides with the sodium derivatives of hydroxy-containing organic compounds such as sodium ethylate. This has been a general procedure for the preparation of heavy metal esters. The reaction of the metal chlorides with alcohols in the presence of acid acceptors of the tertiary amine type such as pyridine and trimethyl amine has also been practiced. Both of these methods are rather expensive and difficult to operate; in the first case the sodium alcoholates are solids, highly reactive with moisture and must be handled accordingly, while in the second instance the amine hydrochloride by-products are both expensive and voluminous, making them difficultly and inefficiently removed from the product ester.

The object of this invention is to provide a simpler and cheaper method of obtaining antimony esters from the antimony chlorides, bromides and iodides.

I have now found that esters of antimony may be prepared by reacting the tri- and penta-halides of antimony, exclusive of the fluorides, and especially the chlorides, with alcohols and supplying anhydrous ammonia to the reaction mixture. My invention, therefore, pertains to a new method, and new compounds resulting therefrom, for the preparation of organic esters of antimony; namely, the organic antimonites and organic antimonates, and comprises reacting under substantially anhydrous conditions, a halide of antimony of the type $SbX_v$, wherein X is selected from the group consisting of chlorine, bromine, and iodine, and $v$ is a number representing one of the two valences of antimony, with an alcohol and supplying anhydrous ammonia to the reaction mixture.

The improved process more specifically comprises dissolving or suspending an antimony chloride in a mixture of the alcohol and a hydrocarbon solvent and contacting the reaction mixture with dry ammonia gas until said reaction mixture becomes alkaline. The reaction is usually exothermic and is carried out satisfactorily between about room temperature and the boiling point of the solvent mixture, care being taken not to exceed the decomposition temperature of the product ester.

In a specific case, antimony trichloride may be dissolved in a mixture of isopropanol and cyclohexane and ammonia passed in until the following reaction is accomplished.

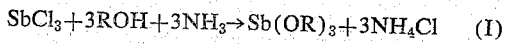  (I)

wherein R is isopropyl. The ammonium chloride is filtered off and the filtrate evaporated and distilled to recover the triisopropyl antimonite.

A better understanding of the detailed application of this invention is provided by the following examples.

Example I

Into a 100 gal. glass-lined kettle was placed 100 lbs. of $SbCl_3$, 150 lbs. of isopropanol, and 320 lbs. of hexane. This mixture was agitated until all of the $SbCl_3$ was dissolved (10–15 minutes). The kettle was then closed and anhydrous ammonia gas was introduced from the bottom. The kettle was cooled by circulating cold water through the kettle jacket and ammonia was introduced as rapidly as necessary to maintain a pressure of 20 p. s. i. After one hour reaction was complete as indicated by no further ammonia absorption.

The mixture was then passed through a centrifuge to separate the precipitated $NH_4Cl$. The clear filtrate was passed through a stripper still at atmospheric pressure to remove the hexane and excess isopropanol.

The undistilled residue from the stripper still was placed in a vacuum still and the product, B. P. 68° C. at 3 mm., was distilled. The yield was 114 lbs. or 87% of theoretical amount of triisopropyl antimonite.

Example II

In a 5-liter flask equipped with an agitator and reflux condenser was added 8 mols (592 grams) of n-butyl alcohol and 1 liter of cyclohexane. To this, with agitation, was added 1 mol (299 grams) of antimony pentachloride. The reaction gave off some heat, the temperature rising to 65° C. Anhydrous ammonia was bubbled in until the solution gave an alkaline reaction to litmus paper. The precipitated ammonium chloride was filtered off. The clear filtrate was stripped of cyclohexane and excess butanol. The temperature was not allowed to rise above 120° C. and the final traces of the solvents were removed under reduced pressure. The product (277 grams) was a white crystalline material which was not distillable without decomposition.

|  | Percent |
|---|---|
| Sb found in product | 37.2 |
| Sb calc. in tributyl antimonate | 34.2 |

The preparations may be carried out in a batch manner as in the examples, or it may be done continuously by bringing the reactants together at controlled rates through pipe lines leading into a common mixing zone. This mixing zone may be heated to promote the reaction, satisfactory final reaction temperatures ranging from 25° to 120° C. The ammonia gas may be added in several places along the pipe line system up to and including the reaction zone. The reaction zone is adapted in size to retain the reactants until reaction is substantially completed, whereupon it may be discharged to a storage tank or fed directly to a filter or centrifuge for the removal of the by-product ammonium chloride crystals. The solvent and excess alcohol are then evaporated by known means and the concentrated antimony ester recovered. The ester product may be purified by distillation, recrystallization, etc.

Theoretically, the antimony chlorides react according to the equation:

  (II)

The alkaline agent serves to remove the HCl and carry the reaction to higher yields. The overall reaction shown in Equation I may be said to occur when the alcohol and antimony chloride are reacted in the presence of ammonia. The process of this invention is also effective when the alcohol and the antimony chloride are reacted and the HCl resulting in Equation II is then neutralized with ammonia. It is believed that the mechanism of the reaction is essentially the same in either case. While the older use of pyridine, etc. serves this purpose, the resulting pyridine hydrochloride is voluminous and tends to carry large volumes of solution with it. Furthermore, due to its organic character, it is frequently more or less soluble in many of the organic solvents used, especially if an excess of the reactant alcohol is used. On the other hand, the stable ammonium chloride is relatively compact and more easily separated and less soluble in organic liquids in general. Even ammonium chloride is slightly soluble in some alcohols; hence, it is preferable to mix the reactant alcohol with suitable volatile hydrocarbon solvents such as low boiling petroleum fractions, hexane, cyclohexane, benzene, toluene, and others. The chlorides of antimony are rather insoluble in some of the useful solvents; it is not necessary, however, to completely dissolve the chloride in the solvent prior to the reaction; it may be suspended in the solvent, preferably in a finely divided state, while the reaction progresses. The halides of antimony applicable to this invention include $SbCl_3$, $SbCl_5$, $SbBr_3$, $SbBr_5$, $SbI_3$, and $SbI_5$, i. e., halide salts wherein the halogen has an atomic number greater than 9.

This process is particularly useful in preparing the lower aliphatic and aromatic esters of antimony wherein the organic groups contain up to and including eight carbon atoms. The process is operative in connection with all alcohols even the polyhydroxy alcohols such as glycerine, ethylene glycol and the higher glycols. Since the reactions with the hydroxyl groups in large molecules is slower and less complete, it is frequently more expedient in the case of such large molecules, as for example isopropyl ricinoleate or hydroxyl-bearing polymers, to first prepare the isopropyl antimony esters and react it metathetically with the larger hydroxy compound. This process is particularly well adapted to the preparation of antimony esters of primary and secondary alcohols in which carbon atoms next adjacent to the OH bearing carbon are free of unsaturated bonds. In the case of the sensitive alcohols such as allyl alcohol and the aliphatic tertiary alcohols, there is a tendency toward lower yields due to the formation of antimony hydroxide and an organic chloride. The method is however satisfactory for the production of antimony esters of phenol and its derivatives.

In supplying the ammonia gas to the reaction mixture it is convenient to maintain a slight positive gas pressure within the apparatus relative to the atmospheric pressure. This guards against the inleakage of moisture and serves to indicate the ammonia requirement thereby permitting the operator to regulate the inflow of the gas accordingly. This positive pressure is not essential in carrying out the process of this invention. Lower partial pressures of ammonia may be used by mixing with non-reactive gas such as dry nitrogen, dry air, etc. This procedure may sometimes be desirable to control the heat of the reaction while at the same time avoiding evacuation of the apparatus due to chemical condensation of the ammonia. Perhaps the most convenient method of supplying the ammonia is by gaseous contact with the reaction mixture. However, it may be supplied in the form of a solution in a suitable non-aqueous solvent.

Esters of the metals of group IV-A of the periodic table of the elements have been prepared successfully by the interaction of alcohols and the tetrachlorides while employing ammonia to neutralize the HCl. The successful use of ammonia in preparing the tri and penta esters of the group V-B elements, that is the phosphorous group, has not previously been disclosed. In fact, it has been found that, in the reaction between $PCl_3$ and n-butanol using ammonia as the acid acceptor, very low yields of the tributyl phosphite were obtained. Surprisingly, however, I find that yields in the case of antimony in accordance with this invention are high and readily obtained.

The advantages of this method over the use of sodium alcoholates or the tertiary amine acid acceptors are quite clear. As previously mentioned, they are economic in nature since ammonia is a much cheaper base on a chemical equivalency basis than either sodium metal or amines. Furthermore, due to the relative insolubility and crystallinity of the ammonium chloride by-product the recovery of products is more efficient.

The products of this invention, particularly the antimony esters of the lower saturated alcohols, are useful as intermediates which may be reacted with the longer and more complex hydroxy compounds such as cellulose. In this respect these products may be used to improve cellulosics with respect to resistance to flame and attack by bacteria. These intermediate esters are also applicable to the preparation of antimony-containing medicinals and insecticides.

I claim as my invention:

1. A process for the preparation of organic esters of antimony which comprises reacting, under substantially anhydrous conditions and at temperatures ranging from 25–120° C., a halide of antimony of the type $SbX_v$, wherein X is selected from the group consisting of chlorine, bromine and iodine, and $v$ is a number representing one of the two normal valences of antimony, with a hydroxy compound and while supplying anhydrous ammonia to the reaction mixture, said hydroxy compound being selected from the group consisting of primary alcohols, secondary alcohols and phenols and said primary and secondary alcohols being further characterized as having the carbon atoms next adjacent to the hydroxyl bearing carbon atom free of double bonds.

2. A process for the preparation of organic esters of antimony which comprises reacting, under substantially anhydrous conditions and at temperatures ranging from 25–120° C., a chloride of antimony with a primary alcohol having the carbon atom next to the hydroxyl-bearing carbon atom free of double bonds, effecting the reaction while supplying anhydrous ammonia to the reaction mixture, separating the resulting ammonium chloride and recovering the antimony ester product.

3. A process for the preparation of antimony triesters which comprises reacting under substantially anhydrous conditions and at temperatures ranging from 25–120° C., a primary alcohol having the carbon atom next to the hydroxyl-bearing carbon atom free of double bonds with antimony trichloride, supplying the reaction mixture with anhydrous ammonia, separating the resulting ammonium chloride and recovering the product ester.

4. A process for the preparation of alkyl antimonates which comprises reacting at temperatures ranging from 25–120° C. under substantially anhydrous conditions antimony pentachloride with a primary alcohol having the carbon atom next to the hydroxyl-bearing carbon atom free of double bonds while agitating and contacting the reaction mixture with gaseous ammonia, separating the solid ammonium chloride and recovering the alkyl antimonate.

5. A process for preparing isopropyl antimonite which comprises reacting at temperatures ranging from 25–120° C. antimony trichloride in a volatile hydrocarbon solvent with substantially anhydrous isopropanol while contacting the reaction mixture with dry ammonia gas, separating the solid ammonium chloride and recovering the isopropyl antimonite.

6. A process for preparing n-butyl antimonate which comprises reacting at temperatures ranging from 25–120° C., under substantially anhydrous conditions, antimony pentachloride in a volatile hydrocarbon solvent with n-butanol while contacting the reaction mixture with ammonia gas and recovering the n-butyl antimonate.

References Cited in the file of this patent

UNITED STATES PATENTS

| | | |
|---|---|---|
| 2,114,866 | Vaughn | Apr. 19, 1938 |
| 2,480,823 | Morris et al. | Sept. 6, 1949 |
| 2,684,972 | Huslam | July 27, 1954 |